(12) United States Patent
Lubera et al.

(10) Patent No.: US 7,725,991 B2
(45) Date of Patent: *Jun. 1, 2010

(54) LOW INSERTION EFFORT FASTENER WITH OFFSET FOR WING

(75) Inventors: Daniel J. Lubera, Macomb, MI (US); Jacob A. Siudym, Emmet, MI (US)

(73) Assignee: Newfrey LLC, Newark, DE (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/180,946

(22) Filed: Jul. 13, 2005

(65) Prior Publication Data

US 2005/0250068 A1    Nov. 10, 2005

Related U.S. Application Data

(60) Division of application No. 10/988,412, filed on Nov. 11, 2004, now Pat. No. 7,287,945, which is a continuation of application No. PCT/US03/16664, filed on May 27, 2003.

(60) Provisional application No. 60/383,511, filed on May 28, 2002.

(51) Int. Cl.
*A44B 17/00* (2006.01)

(52) U.S. Cl. .......................... 24/295; 411/508

(58) Field of Classification Search ................ 411/508; 24/295
See application file for complete search history.

(56) References Cited

U.S. PATENT DOCUMENTS

| | | | |
|---|---|---|---|
| 1,392,561 A | 10/1921 | Duffy | |
| 1,911,934 A | 5/1933 | Van Ostrand et al. | |
| 1,965,520 A | 7/1934 | Boden | |
| 2,100,017 A | 11/1937 | Van Uum | |
| 2,198,186 A | 4/1940 | Tinnerman | |
| 2,295,444 A | 9/1942 | Woodward | |
| 2,315,211 A | 3/1943 | Kost | |
| 2,322,656 A | 6/1943 | Murphy | |
| 2,329,688 A | 9/1943 | Bedford, Jr. | |
| 2,499,637 A | 3/1950 | Flora | |
| 2,540,396 A | 2/1951 | Krach | |
| 2,574,330 A | 11/1951 | Judd | |

(Continued)

FOREIGN PATENT DOCUMENTS

DE    1157434    11/1963

(Continued)

*Primary Examiner*—Flemming Saether
(74) *Attorney, Agent, or Firm*—Harness, Dickey & Pierce, P.L.C.

(57) ABSTRACT

A resilient clip for engaging a structure and having a body portion with a pair of top flanges and a pair of abutting coupling flanges. Each of the abutting flanges has an engagement surface and an engagement member, which engages the mounting structure. The elastic abutting flanges also have a base portion and a transition portion. A ramped surface of the engagement feature extends above the base portion. A substantially flat peripheral surface of the engagement feature in the transition portion is adapted to engage the panel to provide resistance to removal of the fastener from the mounting aperture. To manufacture a clip, a punch is used to apply a force to displace material of the elastic abutting flange portion into a die cavity to form the engagement. The elastic abutting flange portion is bent at a location passing through the engagement feature.

5 Claims, 15 Drawing Sheets

SECTION C-C

U.S. PATENT DOCUMENTS

| | | | |
|---|---|---|---|
| 2,607,971 A * | 8/1952 | Bedford, Jr. ............... 52/713 |
| 2,631,345 A | 3/1953 | Poupitch |
| 2,825,948 A | 3/1958 | Parkin |
| 2,851,757 A | 9/1958 | Pender |
| 2,940,145 A | 6/1960 | Fernberg |
| 3,012,823 A | 12/1961 | Spisak |
| 3,137,372 A | 6/1964 | Nash |
| 3,292,479 A | 12/1966 | Tinnerman et al. |
| 3,310,929 A | 3/1967 | Garvey |
| 3,374,577 A | 3/1968 | Salloum |
| 3,378,983 A | 4/1968 | Anderson |
| 3,486,158 A | 12/1969 | Soltysik et al. |
| 3,509,605 A | 5/1970 | More |
| 3,676,643 A | 7/1972 | Vocke et al. |
| 3,830,134 A | 8/1974 | Erickson |
| 3,869,958 A | 3/1975 | Murayama |
| 3,933,076 A | 1/1976 | Tanaka |
| 3,977,048 A | 8/1976 | Benedetti |
| 4,043,579 A | 8/1977 | Meyer |
| 4,092,766 A | 6/1978 | Meyer |
| 4,103,400 A | 8/1978 | Munse |
| 4,300,865 A | 11/1981 | Murray |
| 4,312,614 A | 1/1982 | Palmer et al. |
| 4,382,414 A * | 5/1983 | Svirklys ............... 108/56.1 |
| 4,470,178 A | 9/1984 | Matsui |
| 4,556,337 A | 12/1985 | Marshall |
| 4,595,325 A | 6/1986 | Moran et al. |
| 4,630,338 A | 12/1986 | Osterland et al. |
| 4,642,859 A | 2/1987 | Kaiser |
| 4,708,895 A | 11/1987 | Mizusawa |
| 4,729,706 A | 3/1988 | Peterson et al. |
| 4,765,036 A | 8/1988 | Iguchi et al. |
| 4,784,430 A | 11/1988 | Biermacher |
| 4,787,795 A | 11/1988 | Kraus |
| 4,865,505 A | 9/1989 | Okada |
| 4,971,500 A | 11/1990 | Benoit et al. |
| 5,086,603 A | 2/1992 | Graf et al. |
| 5,095,592 A | 3/1992 | Doerfling |
| 5,099,549 A | 3/1992 | Hullmann et al. |
| 5,129,768 A | 7/1992 | Hoyle et al. |
| 5,186,517 A | 2/1993 | Gilmore et al. |
| 5,229,175 A | 7/1993 | Seabolt |
| 5,249,900 A | 10/1993 | Mitts |
| 5,251,467 A | 10/1993 | Anderson |
| 5,263,233 A | 11/1993 | Kim et al. |
| 5,310,298 A | 5/1994 | Hwang |
| 5,347,690 A | 9/1994 | Mansoor et al. |
| 5,367,751 A | 11/1994 | DeWitt |
| 5,403,034 A | 4/1995 | Gans et al. |
| 5,422,789 A | 6/1995 | Fisher et al. |
| 5,458,365 A | 10/1995 | Rogers et al. |
| 5,507,545 A | 4/1996 | Krysiak |
| 5,526,553 A | 6/1996 | Klein |
| 5,533,237 A | 7/1996 | Higgins |
| 5,542,158 A | 8/1996 | Gronau et al. |
| 5,651,562 A | 7/1997 | Hagen et al. |
| 5,722,124 A | 3/1998 | Wisniewski |
| 5,758,987 A | 6/1998 | Frame et al. |
| 5,759,004 A | 6/1998 | Kuffel |
| 5,775,861 A | 7/1998 | Leon et al. |
| 5,887,319 A | 3/1999 | Smith |
| 5,919,019 A | 7/1999 | Fischer |
| 5,966,782 A | 10/1999 | Ishihara et al. |
| 5,987,714 A | 11/1999 | Smith |
| 6,074,150 A | 6/2000 | Shinozaki et al. |
| 6,101,686 A | 8/2000 | Velthoven et al. |
| 6,119,316 A | 9/2000 | Ishihara et al. |
| 6,141,837 A | 11/2000 | Wisniewski |
| 6,145,870 A | 11/2000 | Devane et al. |
| 6,279,207 B1 | 8/2001 | Vassiliou |
| 6,317,937 B1 | 11/2001 | Ishihara et al. |
| 6,353,981 B1 | 3/2002 | Smith |
| 6,381,811 B2 | 5/2002 | Smith et al. |
| 6,449,814 B1 | 9/2002 | Dinsmore et al. |
| 6,453,522 B1 | 9/2002 | Romero Magariño et al. |
| 6,481,682 B2 | 11/2002 | Miura |
| 6,517,302 B2 | 2/2003 | Lee |
| 6,527,471 B2 | 3/2003 | Smith et al. |
| 6,568,045 B2 | 5/2003 | Smith |
| 6,606,766 B2 | 8/2003 | Ko |
| 6,629,809 B2 | 10/2003 | Vassiliou |
| 6,648,542 B2 | 11/2003 | Smith et al. |
| 6,665,914 B2 | 12/2003 | Ogawa |
| 6,691,380 B2 | 2/2004 | Vassiliou |
| 6,718,599 B2 | 4/2004 | Dickinson et al. |
| 6,726,418 B2 | 4/2004 | Dickinson et al. |
| 6,745,440 B2 | 6/2004 | Vassiliou |
| 6,840,727 B1 | 1/2005 | Vassiliou |
| 6,846,125 B2 | 1/2005 | Smith et al. |
| 6,868,588 B2 | 3/2005 | Dickinson et al. |
| 6,896,464 B1 | 5/2005 | Vassiliou |
| 6,899,499 B2 | 5/2005 | Dickinson et al. |
| 6,908,274 B1 | 6/2005 | Vassiliou |
| 6,921,237 B2 | 7/2005 | Vassiliou |
| 6,928,705 B2 | 8/2005 | Osterland et al. |
| 2002/0005464 A1 | 1/2002 | Miura |
| 2002/0164200 A1 | 11/2002 | Wisniewski |
| 2002/0194710 A1 | 12/2002 | Dickinson et al. |
| 2003/0024077 A1 | 2/2003 | Vassiliou |
| 2003/0024078 A1 | 2/2003 | Vassiliou |
| 2004/0083582 A1 | 5/2004 | Dickinson et al. |
| 2004/0093701 A1 | 5/2004 | Dickinson et al. |
| 2004/0096272 A1 | 5/2004 | Dickinson et al. |
| 2004/0115027 A1 | 6/2004 | Dickinson et al. |
| 2005/0105987 A1 | 5/2005 | Giugliano et al. |
| 2005/0217082 A1 | 10/2005 | Vassiliou |

FOREIGN PATENT DOCUMENTS

| | | |
|---|---|---|
| DE | 1890436 | 4/1964 |
| DE | 1250688 | 9/1967 |
| DE | 2054212 | 5/1971 |
| DE | 2230309 | 1/1974 |
| DE | 2258213 | 5/1974 |
| DE | 2309144 | 8/1974 |
| DE | 2415853 | 10/1975 |
| DE | 7307039 | 3/1977 |
| DE | 2608157 | 9/1977 |
| DE | 2648467 | 4/1978 |
| DE | 7911161 | 9/1979 |
| DE | 7911162 | 9/1979 |
| DE | 2853254 | 6/1980 |
| DE | 2903541 | 8/1980 |
| DE | 3118415 A1 | 11/1982 |
| DE | 3245056 A1 | 6/1984 |
| DE | 3621772 | 1/1988 |
| DE | 19747953 | 10/1988 |
| DE | 3822463 C1 | 9/1989 |
| DE | 4128114 A1 | 2/1993 |
| DE | 4321303 C1 | 8/1994 |
| DE | 4416698 C2 | 11/1995 |
| DE | 19626050 A1 | 2/1997 |
| DE | 19640165 A1 | 4/1997 |
| DE | 29718903 | 10/1997 |
| DE | 19633203 A1 | 2/1998 |
| DE | 19702429 A1 | 7/1998 |
| DE | 20004580 U1 | 8/2000 |
| DE | 19943602 A1 | 4/2001 |
| DE | 10054334 A1 | 5/2002 |
| DE | 10059522 A1 | 6/2002 |
| EP | 0018851 A1 | 11/1980 |
| EP | 0248591 B1 | 12/1987 |
| EP | 0508977 B1 | 10/1992 |
| EP | 0682184 B1 | 11/1995 |

| | | | | | | |
|---|---|---|---|---|---|---|
| EP | 0855523 B1 | 7/1998 | | GB | 2078851 | 1/1982 |
| EP | 0899466 B1 | 3/1999 | | GB | 2305462 | 4/1997 |
| EP | 0908633 A1 | 4/1999 | | GB | 2316707 | 3/1998 |
| EP | 0930440 A1 | 7/1999 | | JP | 5-32811 | 4/1993 |
| EP | 1083340 A2 | 3/2001 | | JP | 5-69407 | 9/1993 |
| FR | 1477535 | 3/1967 | | JP | 5-69408 | 9/1993 |
| FR | 2520457 | 1/1982 | | JP | 6-247219 | 9/1994 |
| GB | 684098 | 10/1950 | | JP | 7-293521 | 11/1995 |
| GB | 858018 | 9/1958 | | JP | 8-121441 | 5/1996 |
| GB | 1055945 | 3/1964 | | JP | 2001-206157 | 7/2001 |
| GB | 1225623 | 6/1968 | | WO | WO 00/40866 | 7/2000 |
| GB | 1389829 | 4/1975 | | WO | WO 02/44570 A1 | 6/2002 |
| GB | 1406478 | 9/1975 | | | | |
| GB | 1570108 | 6/1980 | | | | |

* cited by examiner

SECTION A-A

SECTION B-B

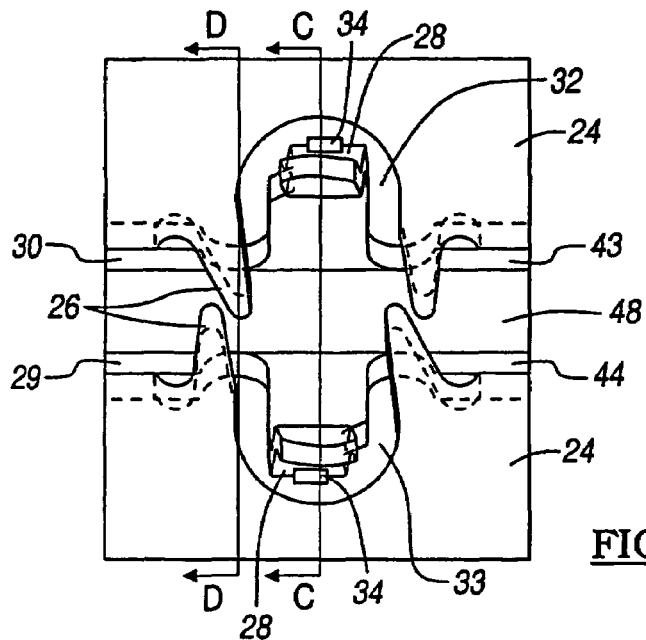
FIGURE 5A
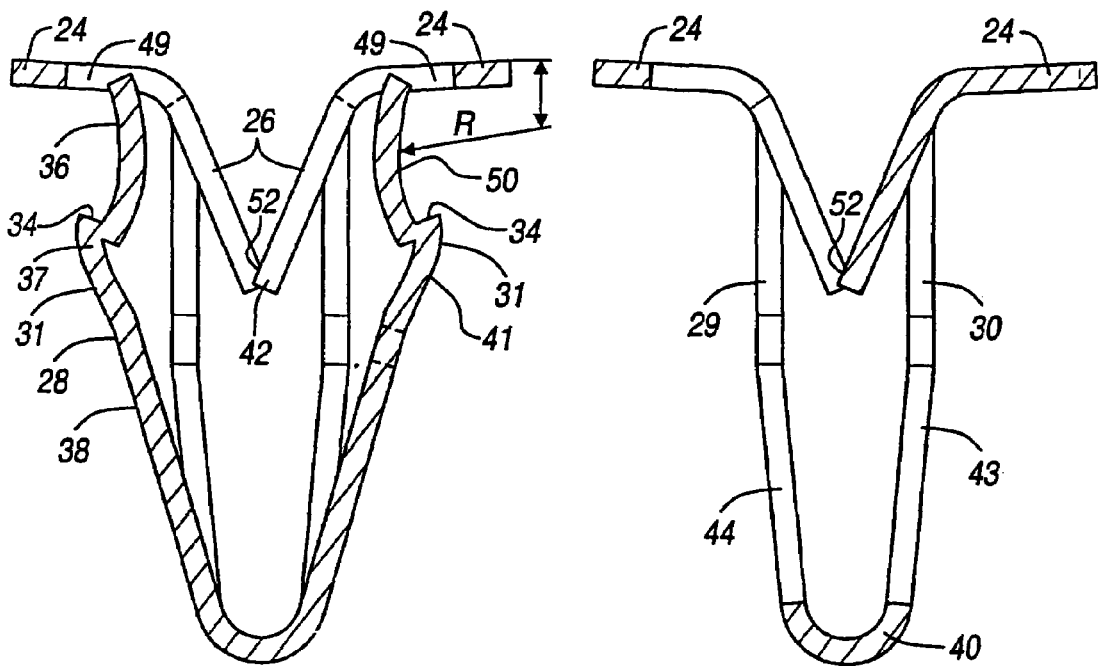
SECTION C-C
FIGURE 5B
SECTION D-D
FIGURE 5C

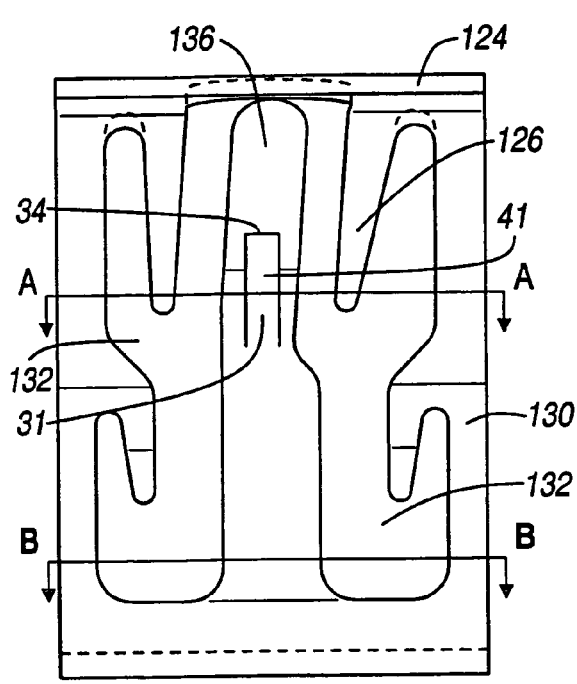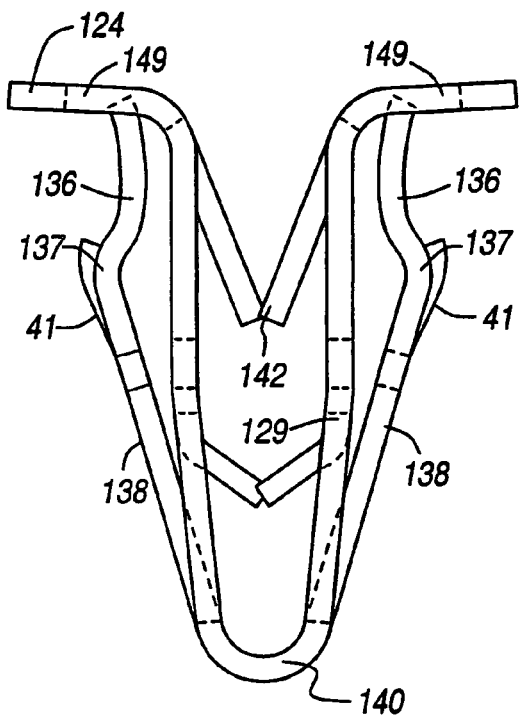
FIGURE 14A
FIGURE 15
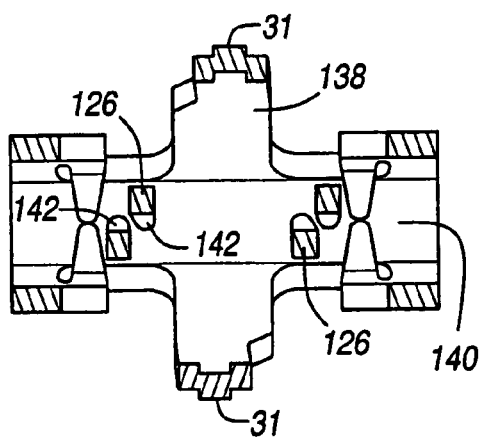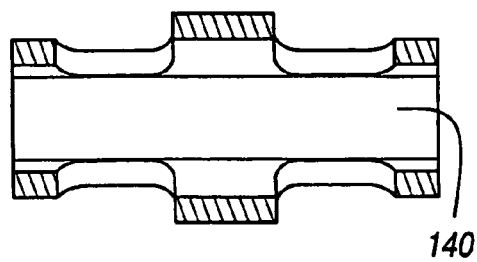
SECTION A-A
FIGURE 14B
SECTION B-B
FIGURE 14C

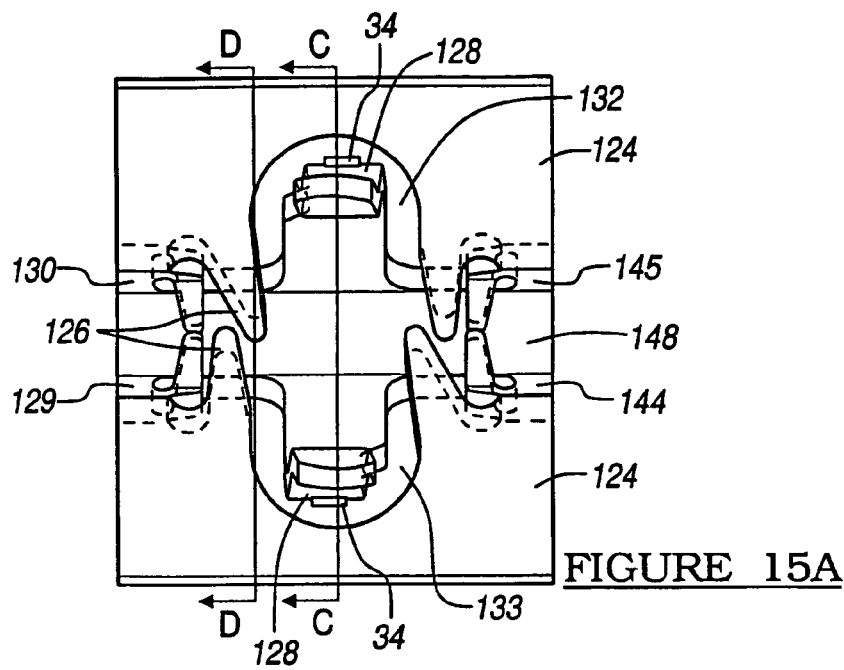
FIGURE 15A
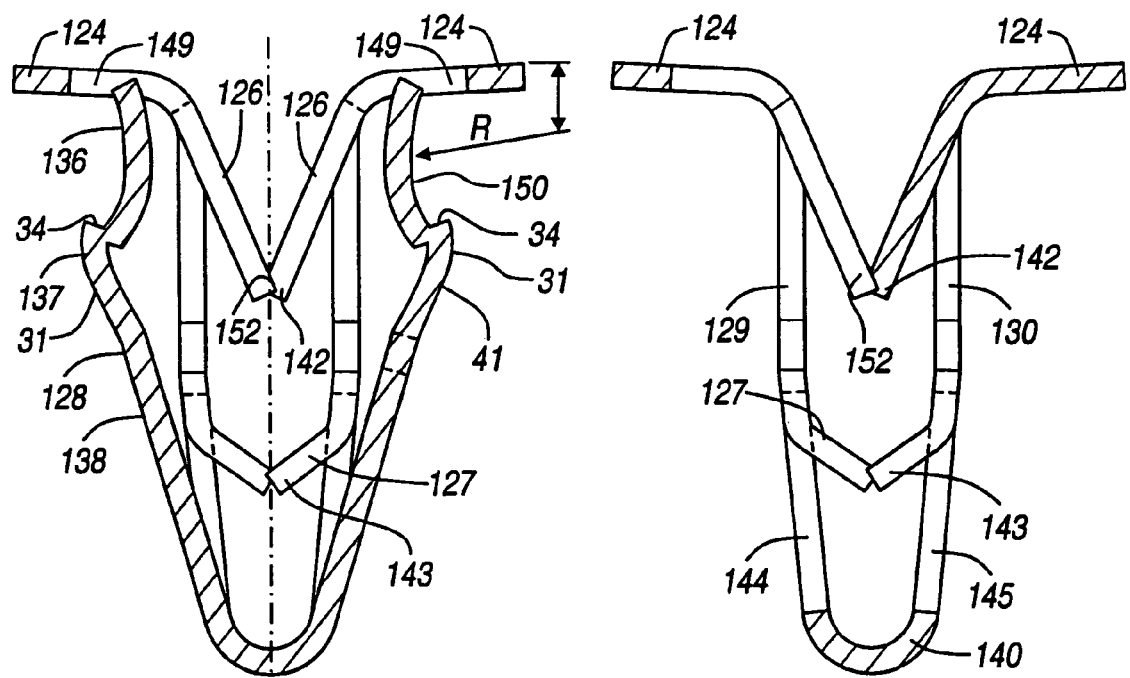
SECTION C-C
FIGURE 15B
SECTION D-D
FIGURE 15C

LOW INSERTION EFFORT FASTENER WITH OFFSET FOR WING

CROSS-REFERENCE TO RELATED APPLICATIONS

This application is a divisional of U.S. Continuation application Ser. No. 10/988,412 filed on Nov. 11, 2004, which is a continuation of International Application No. PCT/US03/16664, filed on May 27, 2003 which claims priority on U.S. Provisional Application No. 60/383,511, filed on May 28, 2002. The disclosures of the above applications are incorporated herein by reference.

TECHNICAL FIELD

The present invention relates generally to resilient clip fasteners and more particularly to a resilient clip fastener that employs a particular surface geometry to secure the body portion of the resilient clip to a structure. More specifically, the present invention relates to a resilient clip fastener having a construction that utilizes abutment flanges to permit the clip to be inserted into an aperture with a relatively low insertion force while resisting relatively high withdrawal forces. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal.

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In accordance with one aspect of the present invention, a fastener for removably mounting an object to a mounting aperture of a panel is provided. A fastener body defines an object aperture adapted to accept a member connected to the object. At least one elastic abutting flange is disposed between the fastener body and the mounting aperture. The elastic abutting flange has an engagement portion configured to engage a surface surrounding the mounting aperture when the fastener is inserted into the mounting aperture. The elastic abutting flange also has a base portion adapted to couple the elastic abutting flange to the fastener body, and a transition portion which has a generally convex shape and which joins the engagement portion to the base portion. An engagement feature extends above an outer surface of the base portion and the transition portion of the elastic abutting flange. The engagement feature is adapted to engage the panel to provide resistance to removal of the fastener from the mounting aperture.

In accordance with another aspect of the present invention, the fastener body includes a generally U-shaped member. The engagement feature has a peripheral surface facing toward the panel and located in the transition portion of the elastic abutting flange. The engagement feature also has a ramped surface sloping away from the peripheral surface toward the outer surface of the base portion.

In accordance with a further aspect of the present invention, a method of manufacturing a fastener adapted to be removably mounted within a mounting aperture of a panel is provided. A blank is cut to define a body portion and an elastic abutting flange portion. A force is applied to a side of a blank to displace material of the elastic abutting flange portion to form an engagement feature raised above an opposing side of the elastic abutting flange portion. The elastic abutting flange portion is bent at a location passing through the engagement feature to form a transition portion separating the elastic abutting flange portion into a base portion coupling the elastic abutting flange to the body portion and an engagement portion capable of being adapted to engage a surface surrounding the mounting aperture when the fastener is inserted into the mounting aperture.

In accordance with another aspect of the present invention, the method includes bending a member of the body portion into a generally U-shaped member to form the object aperture. In addition, a plurality of fingers are bent so that the fingers will extend into the object aperture. Preferably, applying the force forms a cavity in one side of the blank to thereby form the engagement feature on the opposing side of the blank.

In one preferred form, the present invention provides a resilient clip for engaging a structure. The resilient clip includes a body portion having a pair of top flanges, a pair of fastening members and a pair of abutting flanges. Each of the fastening members has a base portion that is coupled to an associated top flange. Each of the abutting flanges has a concave surface that engages the mounting structure.

BRIEF DESCRIPTION OF THE DRAWINGS

Additional advantages and features of the present invention will become apparent from the subsequent description and the appended claims, taken in conjunction with the accompanying drawings, wherein:

FIGS. 3b and 3c depict cross-sectional views of the fastener depicted in FIG. 3a;

FIG. 5a is a top view of a portion of the fastener of FIG. 1, illustrating the clip structure in greater detail;

FIGS. 5b and 5c depict cross-sectional views of the fastener depicted in FIG. 5a;

FIG. 14a is a side view of a portion of the fastener of FIG. 13 illustrating the spacing of the structures in greater detail;

FIGS. 14b and 14c depict cross-sectional views of the fastener depicted in FIG. 14a;

FIG. 15 is a side view of a fastener constructed in accordance with the teachings of the preferred embodiment of the present invention;

FIG. 15a is a top view of a portion of the fastener of FIG. 12, illustrating the clip structure in greater detail;

FIGS. 15b and 15c depict cross-sectional views of the fastener depicted in FIG. 15a;

DETAILED DESCRIPTION OF THE PREFERRED EMBODIMENT

Figure 1:
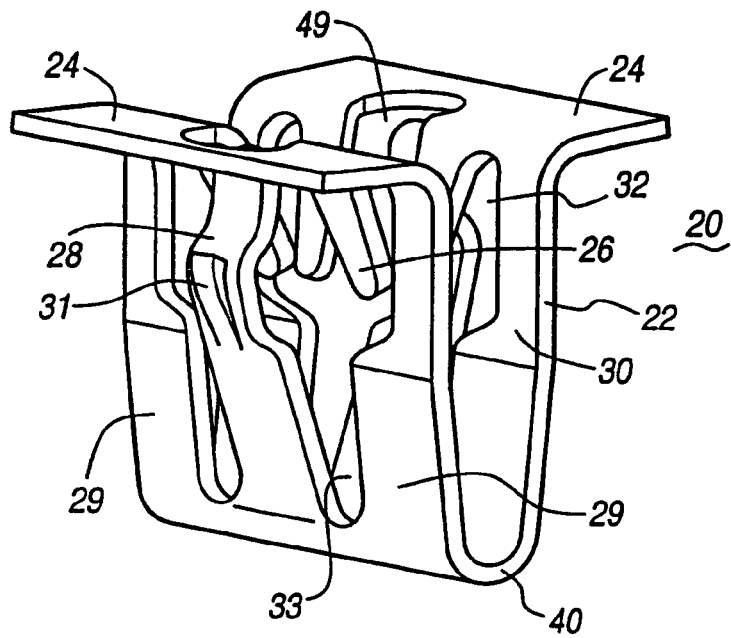
FIG. 1 is a perspective view of a fastener constructed in accordance with the teachings of the present invention.
Figure 2:
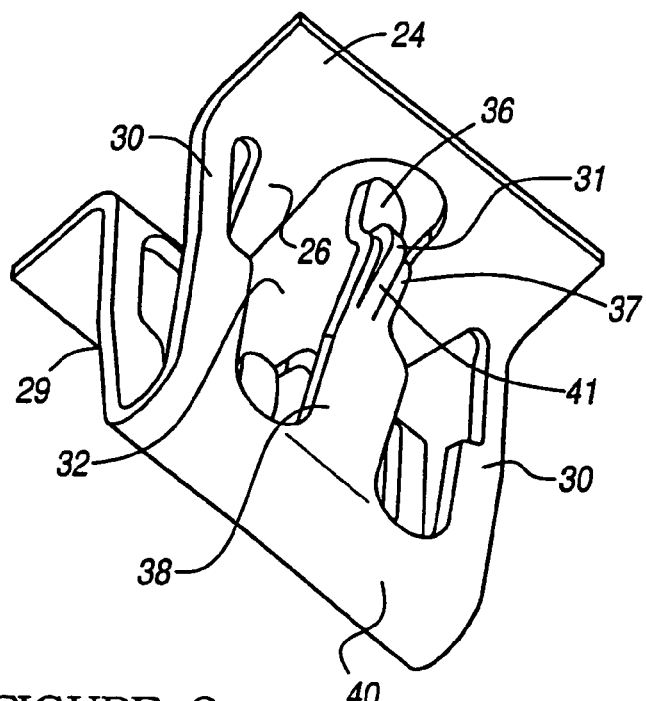
FIG. 2 is a lower perspective view of the fastener of FIG. 1.

Referring to FIGS. 1 through 8, a generally U-shaped fastener 20 in accordance with the present invention is disclosed. The generally U-shaped fastener 20 is defined by a body portion 22 and a pair of top flanges 24. Integral with the top flanges 24 are two pair of finger members 26 which are used to couple the generally U-shaped fastener 20 to a mounting flange (shown in FIG. 11). Additionally, the body portion 22 has a pair of abutting flanges 28 which generally lie outside side members 29 and 30 of the body portion 22. The side members, which are coupled by a bottom curved base portion 40, define a pair of apertures 32 and 33, which allow for the inward compression of the abutting flanges 28.

Generally, the abutting flanges 28 are defined by three portions. The first portion 36 is defined by an exterior concave engaging surface 50. The second portion 37, which acts as a transition to the third portion 38, is defined by a convex surface. The third portion 38 functions to couple the abutting flange 28 to the base portion 40 of the body 22 of the generally U-shaped fastener 20.

Formed on the second portion 37 and third portion 38 is an engagement feature 31. The engagement feature 31 is formed by coining the abutting flange 28 from 2 to 7 thousandths, and preferably 5 thousandths, to define a generally flat engaging surface 34 and generally parallel coined sides 35. The engaging surface 34 is formed at the transition between the first portion 36 and the second portion 37. The engaging feature is defined by a generally ramp-like surface 41.

Figure 3A:
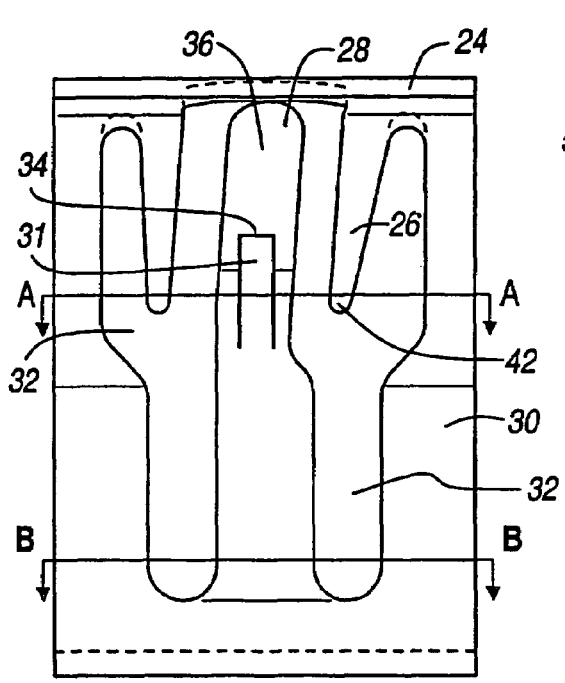
FIG. 3a is a side view of a portion of the fastener of FIG. 1 illustrating the spacing of the structures in greater detail.
Figure 4:
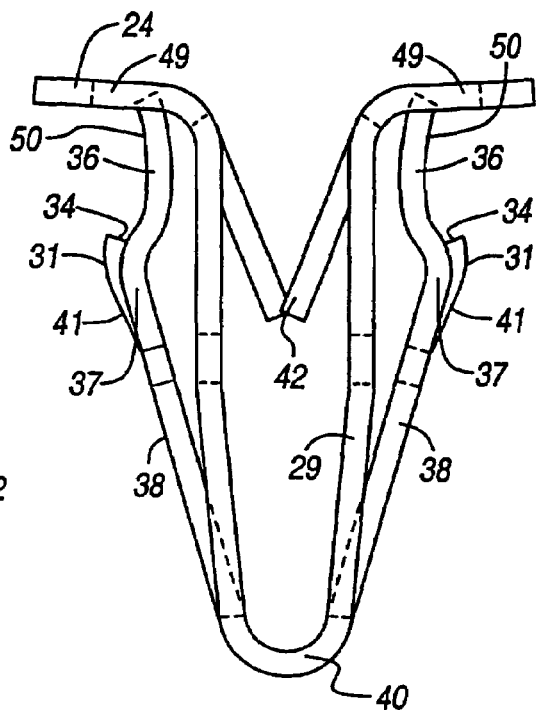
FIG. 4 is a side view of a fastener constructed in accordance with the teachings of the preferred embodiment of the present invention.
Figure 3B:
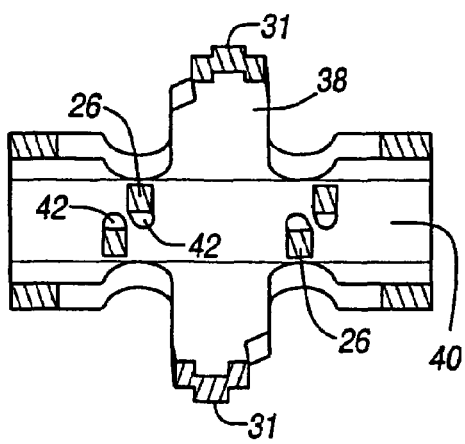
Figure 3C:
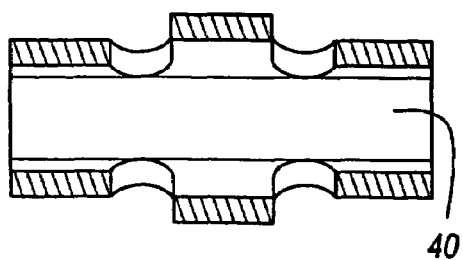

FIG. 3a depicts a side view of the generally U-shaped fastener 20 of the current invention. Shown is the relationship of the finger members 26 to the abutting flanges 28, which are formed within the aperture 32. As best seen in FIGS. 3b and 4, the tips 42 of the finger members 26 are angled to frictionally engage a flange member 54 of a trim component 60. FIG. 3b shows the relationship of the third portion 38 to the base member 40 of the body portion 22.

FIG. 4 is a side view of the U-shaped fastener 20 and shows the relationship of the abutting flanges 28 to the body portion 22. As can be seen, the top flanges 24 define an upper keyhole slot 49 which allow the movement of the abutting flanges 28 when they are compressed. Further depicted is the angular relationship of the side members 29 and 30 of the body portion with respect to the base portion 40 and the top flanges 24. It must be noted that while the finger member 26 are shown, any suitable fastener is usable. This includes but is not limited to a hole, threaded hole, slots or flanges.

FIG. 5a depicts a top view of the generally U-shaped fastener 20. Defined by the side members 29 and 30 is a slot 48 which is used to engage the coupling flange 54 (see FIGS. 9 and 11) of a trim component 60. The exterior concave surface 50 of the abutting flanges 28 are used to engage sheet metal to hold the fastener in place. Also depicted is the interior surface 52 of the finger members 26, which engage the surfaces of the coupling flange 54.

FIG. 5b is a cross-section of the fastener as shown in FIG. 5a. Depicted is the relationship of the abutting flanges 28 with the base member 40. Further, the cross-section details the radius of the exterior concave surface 50. The radius of the concave surface 50 generally can be between 3.5 to 6.0 millimeters and preferably 4.75 millimeters. The center of curvature for the radius R is between 2 and 4 millimeters from the top of the fastener and preferably 2.3 millimeters. FIG. 5c best details the relationship of the finger members 26 to the top flanges 24 and the first and second flange members 43 and 44.

Figure 6:
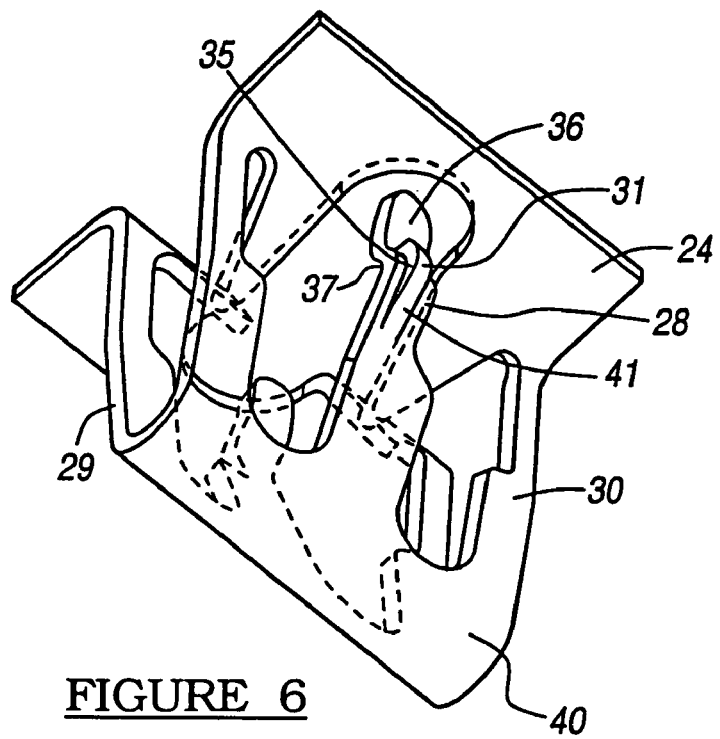
FIG. 6 is a lower perspective view of the fastener of FIG. 1.
Figure 7:
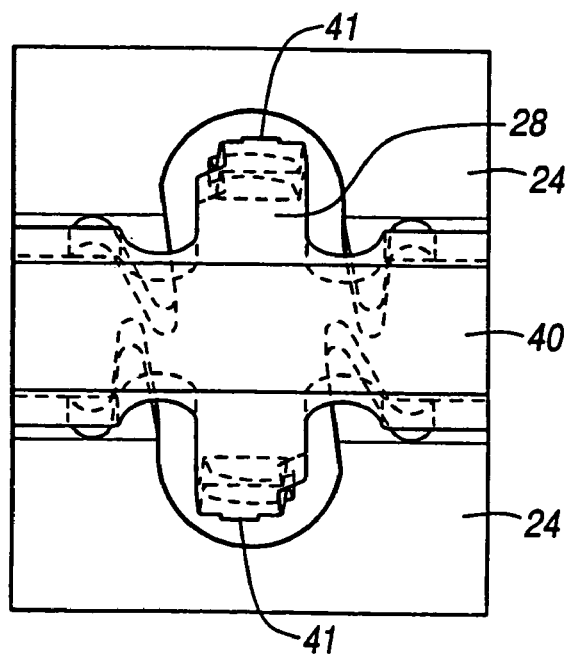
FIG. 7 is a bottom view of the fastener of FIG. 1.
Figure 8:
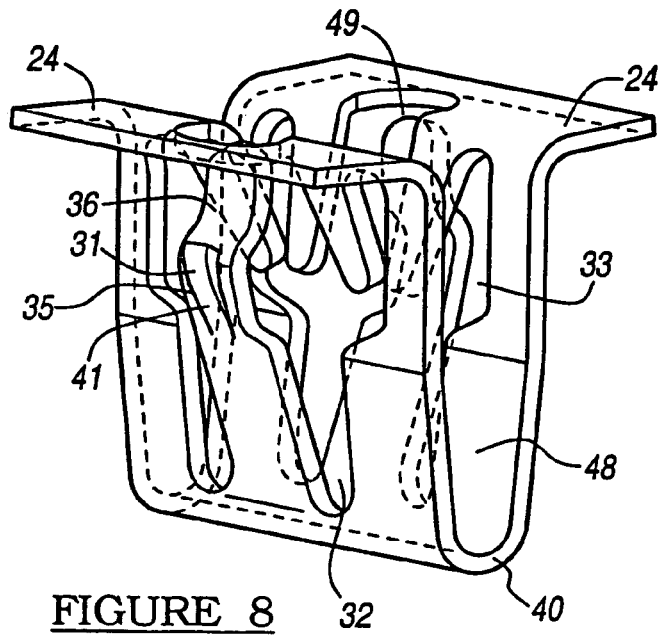
FIG. 8 is a perspective view of the fastener of FIG. 1.

FIGS. 6 through 8 are depictions of the U-shaped fastener 20 of the current invention with hidden components shown in phantom. Depicted is the relationship of the fastener components with various surfaces of the fastener.

Figure 9:
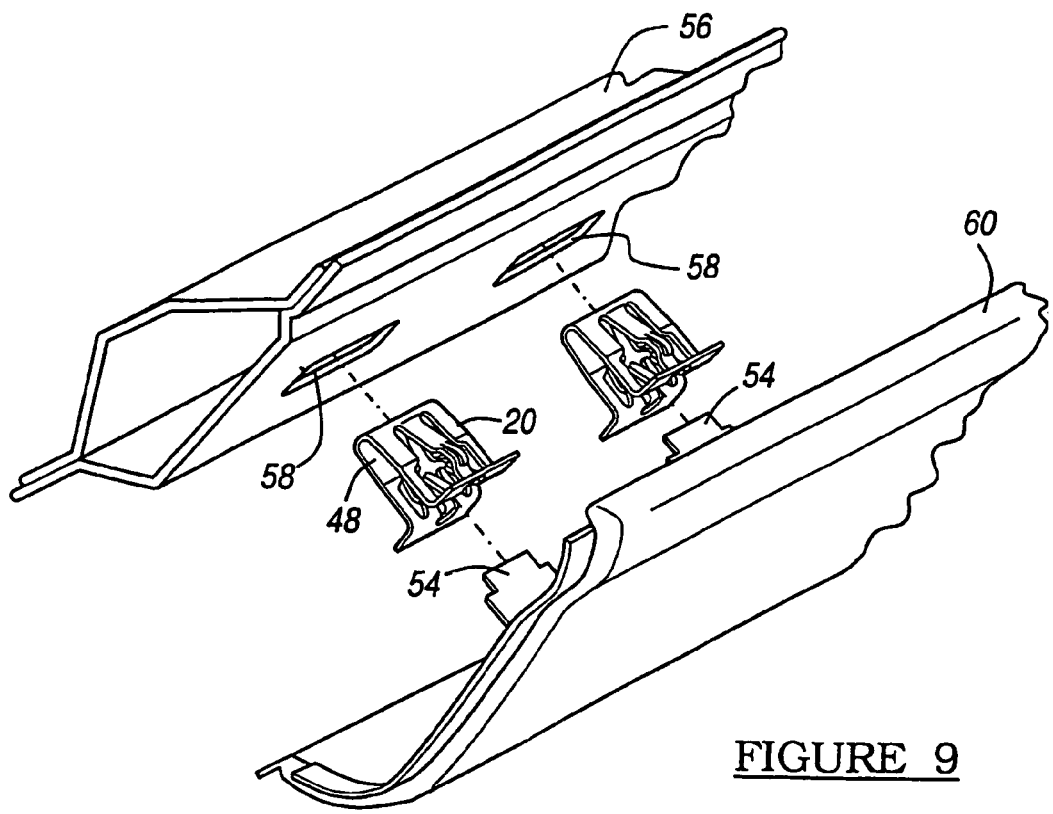
FIG. 9 is an exploded perspective view showing the fastener being used to mount an interior trim component.

FIG. 9 depicts the use of the U-shaped fastener 20 of the current invention. Shown is a sheet metal structure 56, which defines a pair of apertures 58. The apertures 58 are designed to accept the U-shaped fastener 20 to allow for the mating of a trim component 60 to the sheet metal 56. The trim component 60 has a pair of flanges 54, which are inserted, into the slot 48 of the U-shaped fastener 20.

Figure 10A:
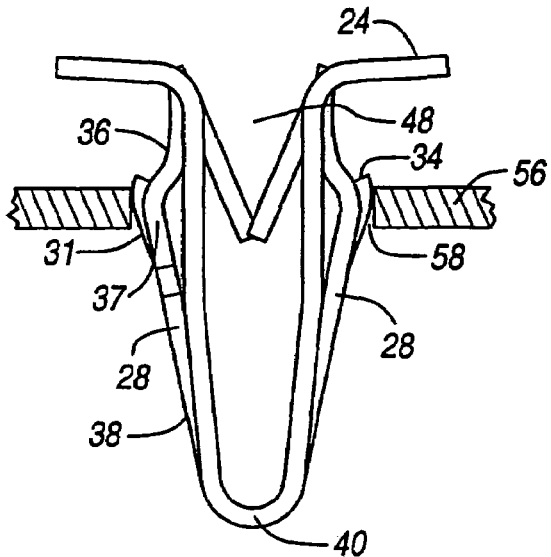
FIGS. 10a and 10b show the insertion of the fastener.
Figure 10B:
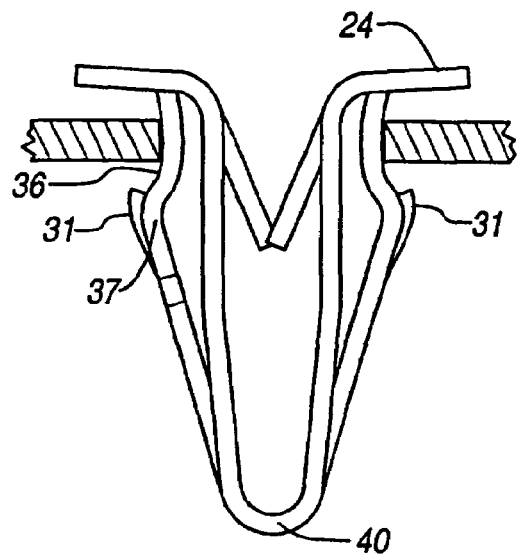

As best seen in FIG. 10, the U-shaped fastener 20 is inserted into the aperture 58 of the sheet metal structure 56. As the fastener 20 is depressed into the aperture 58, the abutting flanges 28 are compressed toward each other and the centerline of the U-shaped fastener 20. This compression of the abutting flanges 28 continues until the sheet metal 56 of the aperture 58 reaches the ramp-like surface 41 of engagement feature 31 on the abutting flanges 28. At this point, a transition occurs and the sheet metal 56 is allowed to pass over engaging surface 34 and to engage with the concave surface 56 of the first portion 36 of the abutting flanges 28.

Figure 11:
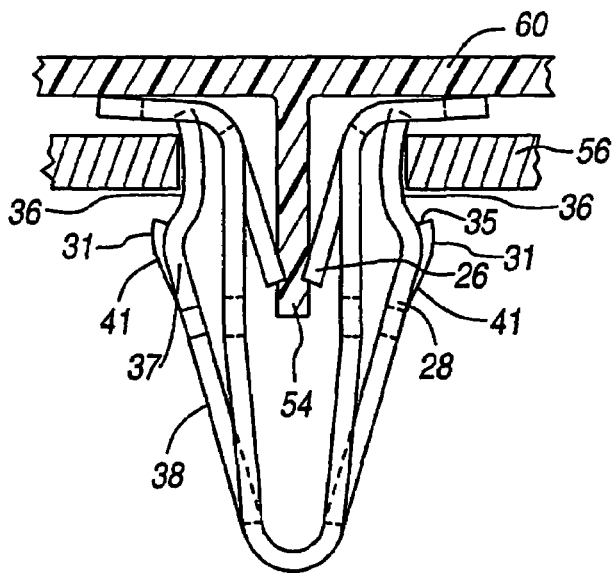
FIG. 11 is a cross-sectional view of the fastener of FIG. 10 with corresponding trim component.
Figure 12:
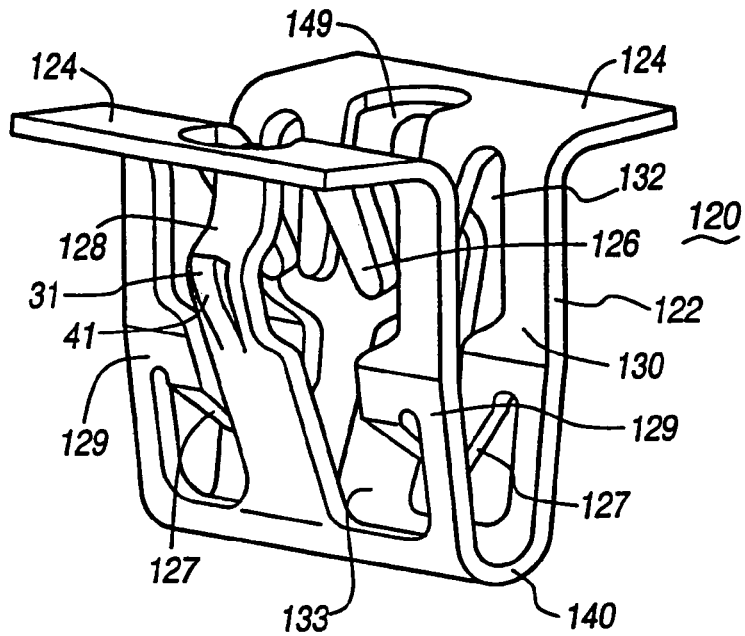
FIG. 12 is a perspective view of a fastener constructed in accordance with the teachings of a second embodiment of the present invention.
Figure 13:
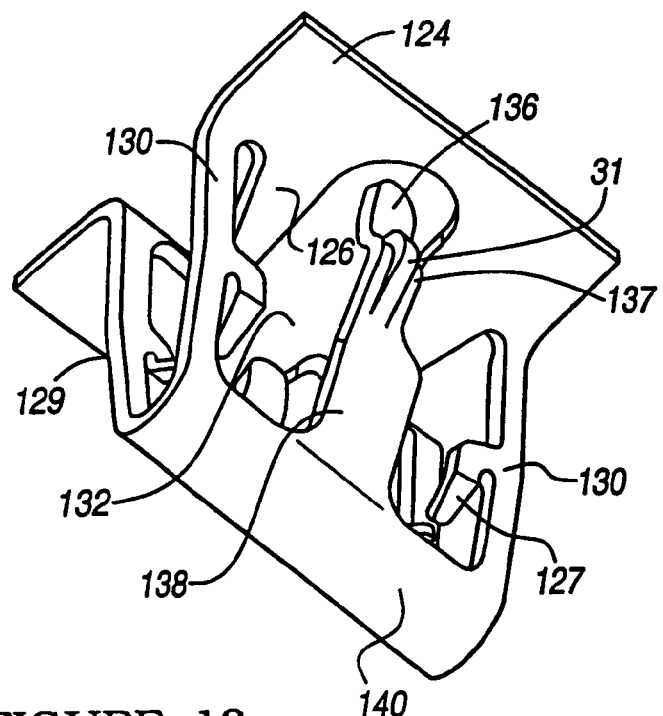
FIG. 13 is a lower perspective view of the fastener of FIG. 12.

FIG. 11 depicts the coupling of the trim component 60 to the U-shaped fastener 20. Shown is the coupling flange 54 inserted between the finger members 26 of the U-shaped fastener 20.

It has been shown that the current fastener 20 is significantly more easy to insert into a sheet metal structure 56 than it is to remove. For example, the fastener as depicted has a required insertion force of about 10 pounds and a removal force of greater than 20 pounds. Preferably, the removal force is at least about two times that of the required insertion force. More preferably, the removal force is at least about three times the force required for insertion.

Referring to FIGS. 12 through 20, a generally U-shaped fastener 20 in accordance with a second embodiment of the present invention is disclosed. The generally U-shaped fastener 120 is defined by a body portion 122 and a pair of top flanges 124. Integral with the top flanges 124 are two pair of first finger member 126 and a pair of second finger member 127 which are used to couple the generally U-shaped fastener 120 to a mounting flange (shown in FIG. 20). Additionally, the body portion 122 has a pair of abutting flanges 128 which generally lie outside the side members 129 and 130 of the body portion 122. The side members 129 and 130 define a pair of apertures, 132 and 133, which allow for the inward compression of the abutting flanges 128.

Generally, the abutting flanges 128 are defined by three portions. The first portion 136 is defined by an exterior concave engaging surface 150. The second portion 137, which acts as a transition to the third portion 138, is defined by a convex surface. The third portion 138 functions to couple the abutting flange 128 to the base portion 140 of the body 122 of the generally U-shaped fastener 120.

FIG. 14a depicts a side view of the generally U-shaped fastener 120 of the second embodiment of the current invention. Shown is the relationship of the first finger member 126 and second finger member 127 to the abutting flanges 128, which are formed within the aperture 132. As best seen in FIGS. 14b and 15, the tips 142 of the first finger member 126 and the tips 143 of the second finger member 127 are angled to frictionally engage a flange member 154 of a trim component 160. The angle of the first finger member 126 can be between about 15 degrees to 25 degrees and preferably about 20 degrees, while the angle of the second finger member 127 can be between about 50 degrees to 60 degrees and preferably about 55 degrees. FIGS. 14b and 14c show the relationship of the third portion 138 to the base member 140 of the body portion 122.

FIG. 15 is a side view of the U-shaped fastener 120 and shows the relationship of the abutting flanges 128 to the body portion 122. As can be seen, the top flanges 124 define an upper keyhole slot 146 which allow the movement of the abutting flanges 128 when they are compressed. Further depicted is the angular relationship of the side members 129 and 130 of the body portion with respect to the base 140 and the top flanges 124. It must be noted that while the finger members 126 and 127 are shown, any suitable fastener is usable. This includes but is not limited to a hole, threaded hole, slots or flanges.

FIG. 15a depicts a top view of the generally U-shaped fastener 120. Defined by the side members 129 and 130 is a slot 148 which is used to engage the coupling flange 154 (see FIGS. 19 and 21) of a trim component 160. The exterior concave surface 150 of the abutting flanges 128 are used to engage sheet metal to hold the fastener in place. Also depicted is the interior surface 152 of the first and second finger members 126 and 127, which engage the surfaces of the coupling flange 154.

FIG. 15b is a cross-section of the fastener as shown in FIG. 15a. Depicted is the relationship of the abutting flanges 128 with the base member 140. Further, the cross-section details the radius of the exterior concave surface 150. The radius of the concave surface 150 generally can be between 3.5 to 6.0 millimeters and preferably 4.75 millimeters. The center of curvature for the radius R is between 2 and 4 millimeters from the top of the fastener and preferably 2.3 millimeters. FIG. 15c best details the relationship of the first finger member 126 to the top flanges 124 and the first and second flange members 143 and 144.

As described above, the first pair of finger members 126 and the second pair of finger members 127 extend into the object aperture or slot 148 at an angle. The angle may be similar with respect to both pairs of finger members 126 and 127. However, it is preferred that the angle of the second pair of finger members 127 be slightly greater. This additional or second pair of cooperating finger members 127 extends into the object aperture 148 at a location closer to the base portion 140 of the U-shaped member than the plurality of finger members 126. In addition, each of the pairs of finger members 126, 127 intersect a central plane (shown in dotted line) extending through the object aperture 148.

Figure 16:
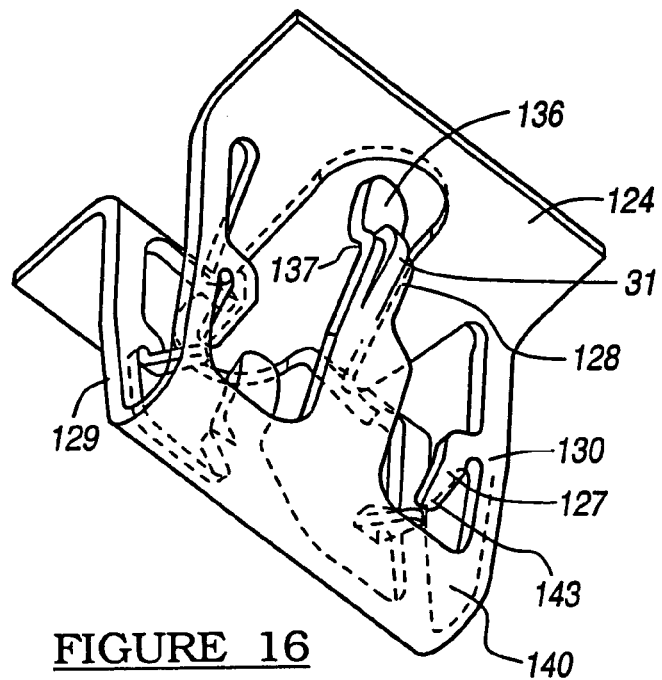
FIG. 16 is a lower perspective view of the fastener of FIG. 12.
Figure 17:
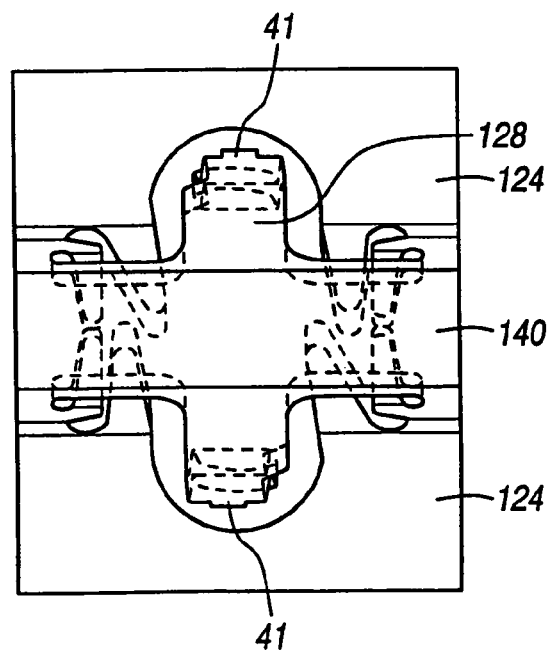
FIG. 17 is a bottom view of the fastener of FIG. 12.
Figure 18:
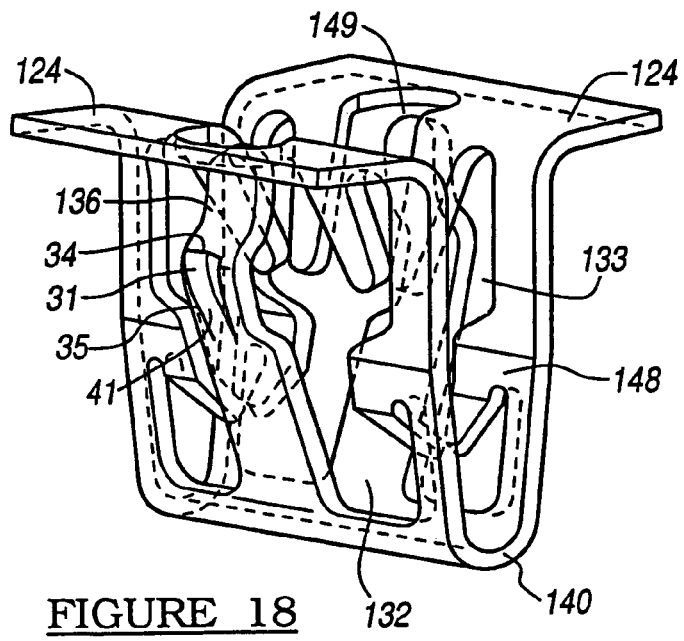
FIG. 18 is a perspective view of the fastener of FIG. 12.

FIGS. 16 through 18 are depictions of the U-shaped fastener 120 of the current invention with hidden components shown in phantom. Depicted is the relationship of the fastener components with various surfaces of the fastener.

Figure 19:
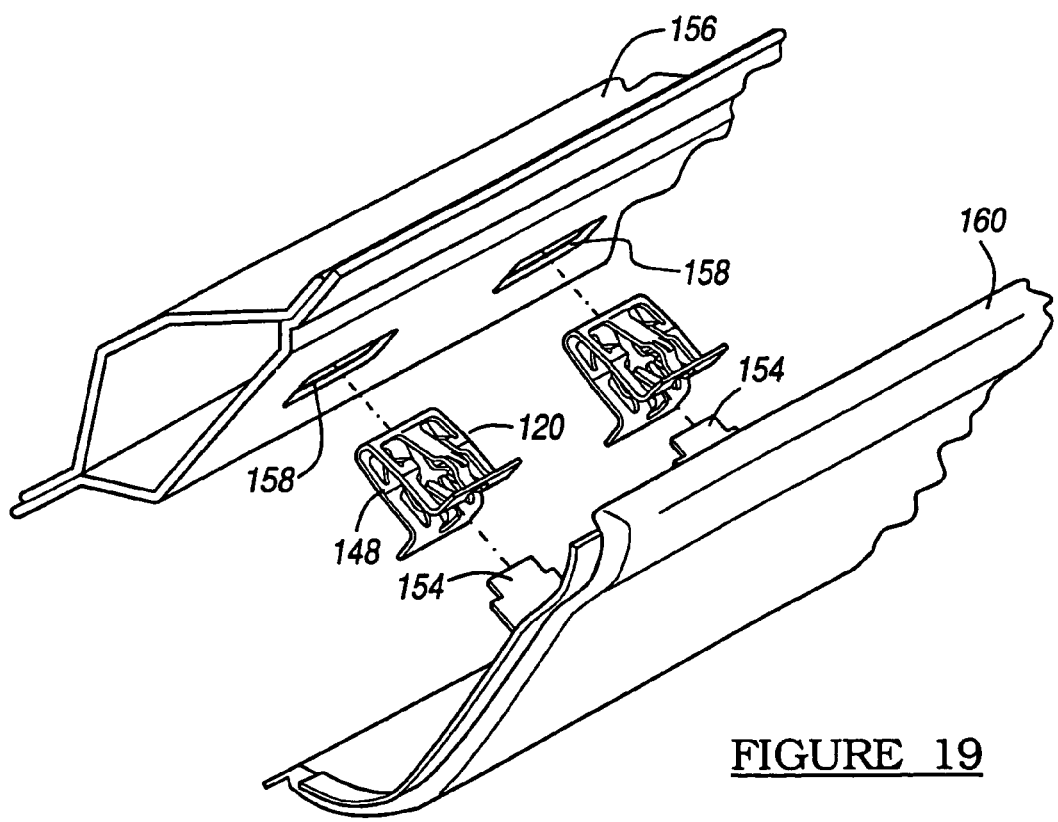
FIG. 19 is an exploded perspective view showing the fastener being used to mount an interior trim component.

FIG. 19 depicts the use of the U-shaped fastener 120 of the current invention. Shown is a sheet metal structure 156, which defines a pair of apertures 158. The apertures 158 are designed to accept the U-shaped fastener 120 to allow for the mating of a trim component 160 to the sheet metal 156. The trim component 160 has a pair of flanges 154, which are inserted, into the slot 148 of the U-shaped fastener 120.

Figure 20A:
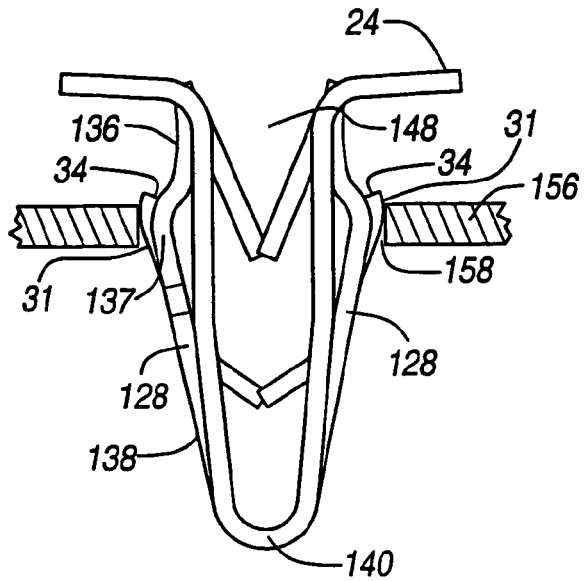
FIGS. 20a and 20b show the insertion of the fastener.
Figure 20B:
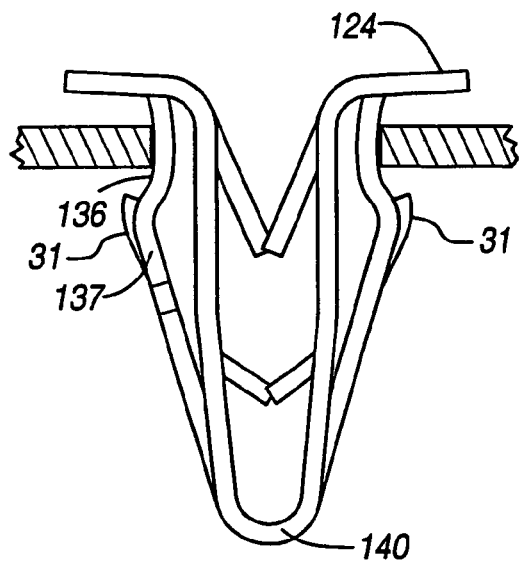

As best seen in FIG. 20, the U-shaped fastener 120 is inserted into the aperture 158 of the sheet metal structure 156. As the fastener 120 is depressed into the aperture 158, the abutting flanges 128 are compressed toward each other and the centerline of the U-shaped fastener 120. This compression of the abutting flanges 128 continues until the sheet metal 156 of the aperture 158 reaches the second portion 137 of the abutting flanges. At this point, a transition occurs and the sheet metal 156 is allowed to engage with the concave surface 156 of the first portion 136 of the abutting flanges 128.

Figure 21:
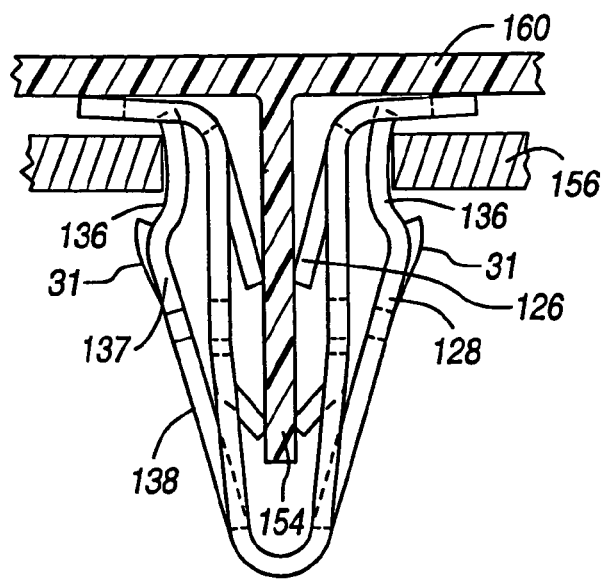
FIG. 21 is a cross-sectional view of the fastener of FIG. 20 with corresponding trim component.

FIG. 21 depicts the coupling of the trim component 160 to the U-shaped fastener 120. Shown is the coupling flange 154 inserted between the first and second finger members 126 and 127 of the U-shaped fastener 120.

It has been shown that the current fastener 120 is significantly more easy to insert into a sheet metal structure 156 than it is to remove. For example, the fastener as depicted has a required insertion force of about 10 pounds and a removal force of greater than about 35 pounds, and more particularly 40-45 pounds.

Figure 22A:
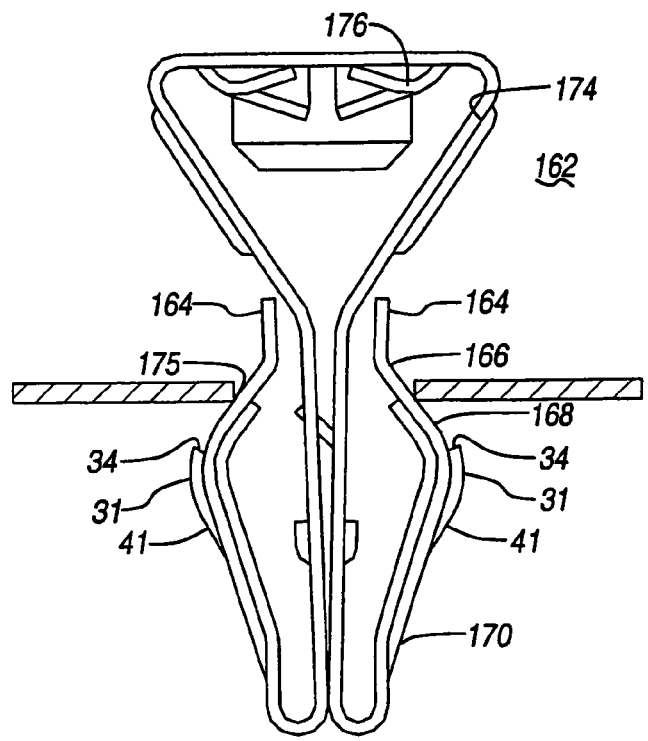
FIGS. 22a, 22b and 22c represent side and front views of an alternate embodiment of the present invention.
Figure 22C:
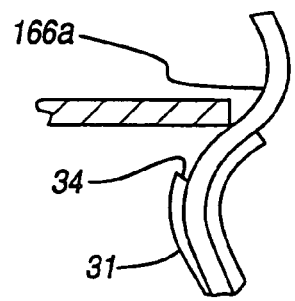
Figure 22B:
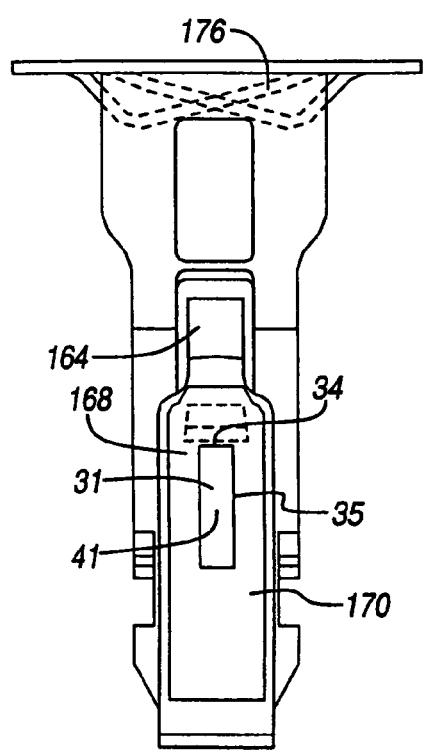

FIGS. 22a and 22b represent side and front views of an alternate retainer 162 according to the teachings of the present invention. Retainer 162 is a W-shaped retainer having depending abutting flanges 164. The abutting flanges 164 are formed by a first engagement portion 166, a second transition portion 168, and third portion 170.

The third portion 170 functions to couple the abutting flange 164 to a retainer body 172. The retainer body 172 is shown having a head portion 174 having a sheet metal nut 176. It is envisioned that any type of fastener coupling member such as a flange receiving slot or a stud can be disposed on the head portion 174.

The first engagement portion 166 functions to engage the edges of a sheet metal hole 175. Defined on the second transition portion 168 and the third portion 170 is the engagement feature 31. The engagement feature 31 is formed by coining the abutting flange 164 from 2 to 7 thousandths to define the generally flat engaging surface 34, the ramp-like surface 41, and generally parallel coined sides 35.

Retainer 162 is inserted into hole 175 of the sheet metal structure 56. As the retainer 162 is depressed into the aperture 58, the abutting flanges 164 compress toward the retainer body 172. This compression continues until the aperture 58 reaches the ramp-like surface 41 of engagement feature 31. After passing over the engagement surface 34, the aperture 58 snaps into the first engagement portion 166. As seen in FIGS. 22c and 23c, it is envisioned that the first engagement portion 166 can be a defined concave surface 166a.

Figure 23A:
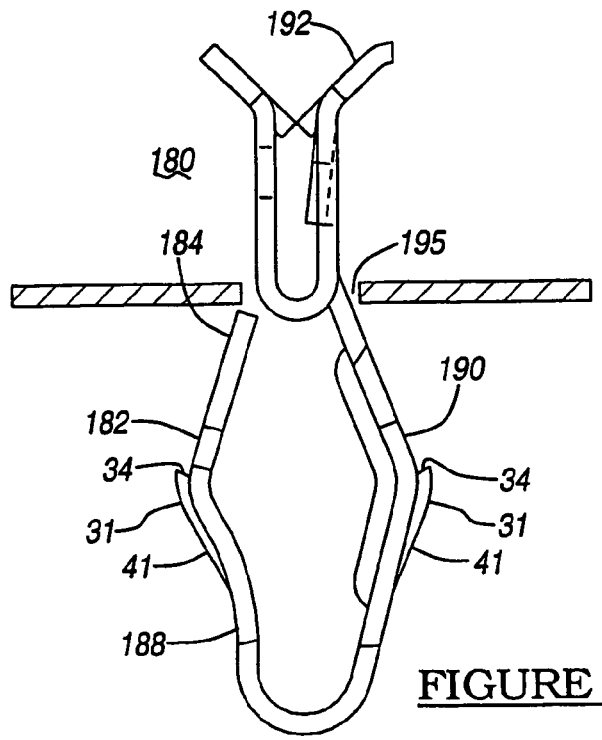
FIGS. 23a, 23b and 23c represent side and front views of yet another alternate embodiment of the present invention.
Figure 23C:
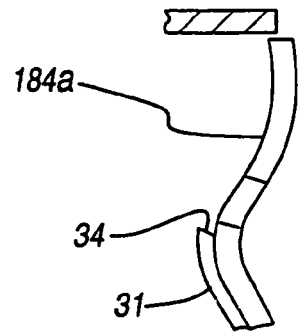
Figure 23B:
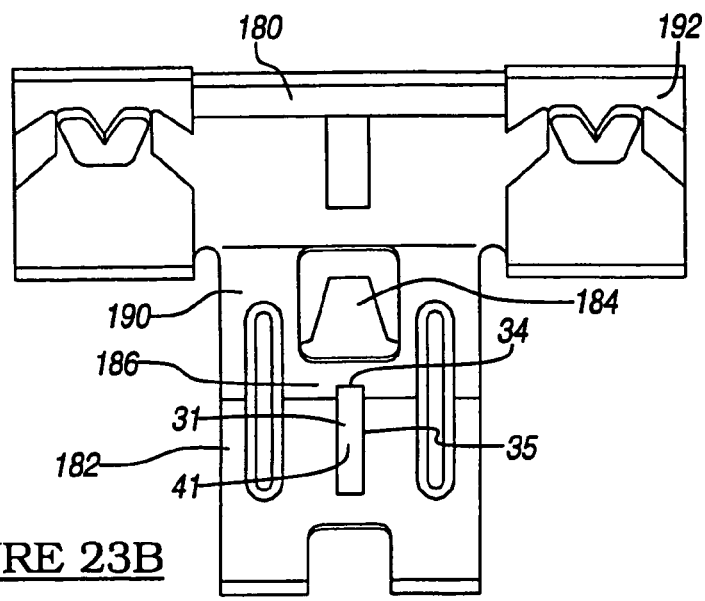

FIGS. 23a and 23b are front and side views of alternate retainer 180 according to the teachings of the present invention. Retainer 180 represents a V-shaped retainer. Generally, a V-shaped retainer has a single compressible abutting flange 182. The abutting flange 182 has a first engagement portion 184, a second transition portion 186, and third portion 188. The third portion 188 functions to hold the abutting flange 182 to body portion 190. Body portion 190 defines a head 192. The head 192 defines any type of fastener coupling member such as a stud, a nut or flange coupling mechanism.

The first engagement portion 184 functions to hold the edges of a sheet metal slot 192. Defined on the second transition portion 186 and the third portion 188 is the engagement feature 31. It is envisioned that the first engagement portion 184 can be a concave mating surface 184a. The functioning of the abutting flange is detailed above in descriptions of FIGS. 22a and 22b.

Figure 24:
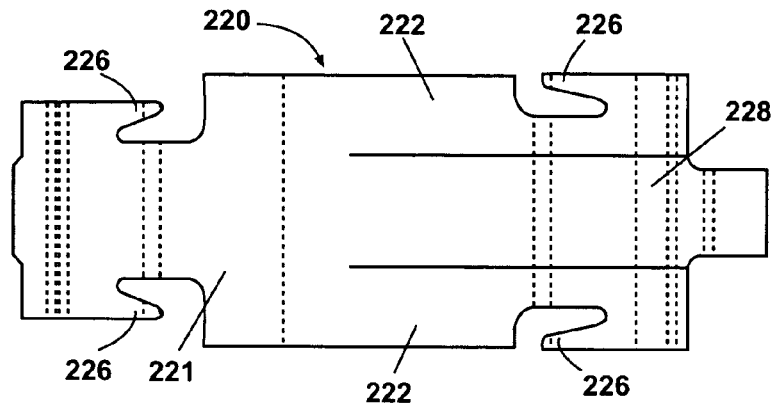
FIG. 24 is a top plan view of a blank used to form a fifth embodiment of the present invention.

With reference to FIGS. 24-27, a preferred method of manufacturing fasteners according to the present invention is described. FIG. 24 illustrates a blank for a fastener 220 which has been cut out of a sheet of metal material. The fastener 220 generally defines a body 221, finger member portions 226, body portions 222, and elastic abutting flange portion 228.

Figure 25:
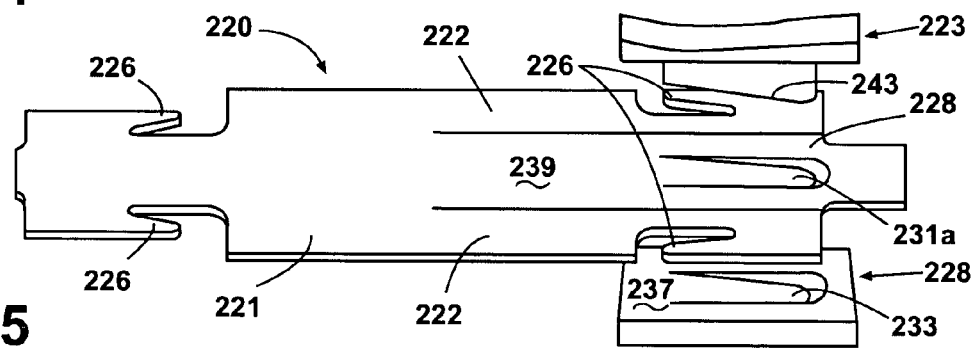
FIG. 25 is a perspective view of the blank and the punch and die used in forming the engagement feature.

Referring to FIG. 25, the blank for fastener 220 is subjected to a punch 223 and die 225 operation which forms the engagement feature 231 out of the material of the elastic abutting flange portion 228 of the fastener 220. The die 225 includes a surface 227 which is brought into contact with the lower surface 229 (as seen in FIG. 25) of the fastener 220. The surface 227 of the die 225 includes a cavity 233 which generally corresponds to the shape and dimension of the engagement feature 231 to be formed.

Similarly, the punch 223 includes an end portion 243 which has a shape and dimension which generally corresponds to that of the engagement feature 231 to be formed. The punch 223 is used to apply a force to one side 239 of the fastener 220 to displace material of the elastic abutting flange portion 228 into the cavity 233 of the die 225. Thus, the engagement feature 231 is formed as a raised element above the lower surface 229 of the opposing side of the fastener 220. Preferably, the end portion 243 of the punch 223 is dimensioned to be substantially identical to a corresponding portion of the cavity 233 which forms the engaging surface or periphery 234 of the engagement feature 231 which faces toward the panel when the fastener 220 is inserted into the panel aperture. More preferably, the end portion 243 of the punch 223 and the cavity 233 are shaped and sized to be substantially identical. In addition, the end portion 243 of the punch 223 which contacts the fastener 220 preferably has sharp edges.

Figure 26:
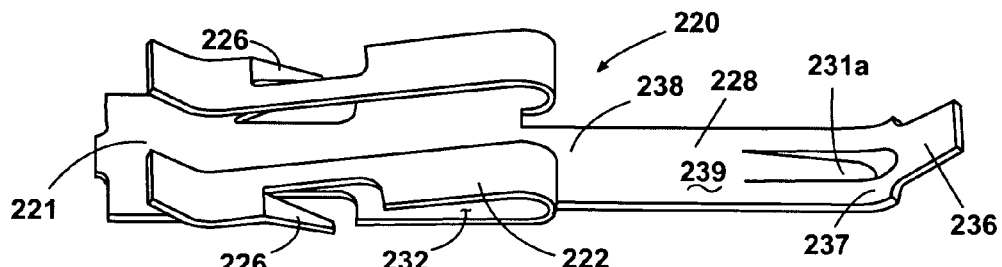
FIG. 26 is a perspective view of the blank in a partially formed configuration.

Referring to FIG. 26, the body portions 222 of the fastener 220 has been subjected to several bending operations. For example, both body portions 222 are bent into a generally U-shape with body 221, thereby defining the object aperture 232. In addition, the finger members 226 have been bent so that they extend into the object aperture 232. Further, the elastic abutting flange portion 228 has also been subjected to a bending operation. This bending operation bends the elastic abutting flange portion 228 at a location passing through the engagement feature 231, thereby forming a transition portion 237 separating the elastic abutting flange portion 228 into a base portion 238 which couples the elastic abutting flange portion 228 to the body 221 and an engaging surface portion 236. The engaging surface portion 236 is adapted to engage an inner surface of the mounting aperture when the fastener 220 is inserted into the mounting aperture.

This latter bending operation provides the transition portion 237 with a generally convex shape. In addition, the bending is preferably accomplished at a location including the periphery or engaging surface 234 at the distal end of the engagement feature 231 which faces toward the panel when the fastener 220 is mounted within the mounting aperture of the panel. Furthermore, the portion of the engagement feature 231 which faces away from the panel is preferably formed with a ramped wall 241 sloping away from the engaging surface 234 toward an adjacent surface 229 of the opposing side of the fastener blank. The angle of this ramped wall 241 in relation to the adjacent surface of the elastic abutting flange portion is preferably at least about 0.01 degrees and less than about 5 degrees.

Figure 27:
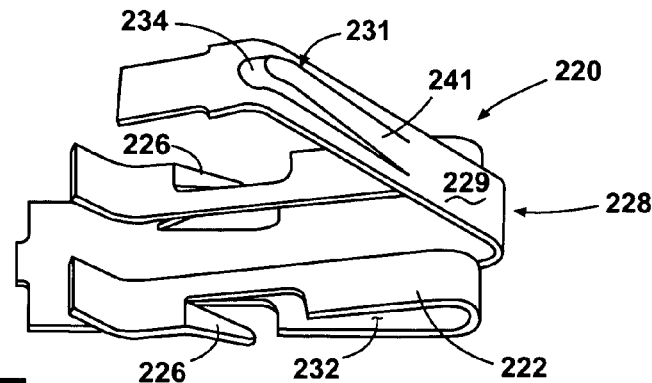
FIG. 27 is a perspective view of the fully formed fastener of this fifth embodiment.

With reference to FIG. 27, the fully formed fastener 220 of this preferred embodiment is illustrated. As with the previous embodiments, the fastener 220 generally defines an object aperture adapted to accept a member connected to the object. The fastener 220 is defined by bending body portions 222 both toward body 221 to create a generally U-shaped member. A plurality of cooperating finger members 226 extend from the fastener body 221 into the object aperture 232. The cooperating finger members 226 are adapted to slidably accept insertion of a member connected to the object into the object aperture 232 and to resist removal of the member from the object aperture 232.

The engagement feature 231 is formed from material which has been displaced from a cavity 231a formed in the internal surface or side 239 of the elastic abutting flange portion 228. The engagement feature 231 is formed of material which has been displaced outwardly in relation to the surrounding material of the elastic abutting flange portion 228. Although the material has been displaced, it remains continuously, integrally connected to the adjacent material from which it was formed. It is preferred that the material forming the engagement feature 231 remains continuously, integrally connected with the surrounding material of the elastic abutting flange portion 228 from which it was formed around its periphery. It is more preferred that the material forming the engagement feature 231 remains continuously, integrally connected with the surrounding material of the elastic abutting flange portion 228 from which it was formed at the engaging surface 234 or distal end of the engagement feature which faces the panel upon insertion into the aperture thereof. It is even more preferred that the material forming the engagement feature 231 remains continuously, integrally connected with the surrounding material of the elastic abutting flange portion 228 around its entire periphery.

A preferred punch 223 and cavity 233 as discussed above is beneficial in providing a relatively sharp edged, or more angularly defined, engagement feature 231. In contrast, a punch 223 which is meaningfully smaller than the dimensions of the cavity 233 and/or which has relatively rounded edges will produce an engagement feature 231 having a more rounded profile. Preferably, the engaging surface 234 of the engagement feature 231 which faces the panel upon insertion into the aperture thereof extends upwardly at an angle in relation to the surrounding fastener blank (prior to bending of the elastic abutting flange portion as discussed below) which is less than about 110 degrees; and more preferably, less than about 90 degrees. In addition, the engaging surface 234 of the engagement feature 231 which faces the panel upon insertion into the aperture thereof preferably has a substantially flat face.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastener for removably mounting an object to a mounting aperture of a panel, comprising:
    a fastener body defining an object aperture adapted to accept a member connected to the object;
    at least one elastic abutting flange disposed between the fastener body and the mounting aperture;
    a first plurality of cooperating finger members having individual ones of the first plurality of finger members extending from the fastener body into the object aperture at a first angle and adapted to slidably accept insertion of the member connected to the object into the object aperture and resist removal of the member from the object aperture;
    a second plurality of cooperating finger members having individual ones of the second plurality of finger members extending from each of the side members of the fastener body into the object aperture at a location closer to an open end of the object aperture than the first plurality of cooperating finger members and at a second angle greater than the first angle;
    each of the first and second plurality of finger members intersecting a central plane extending through the object aperture, the first and second angles being measured relative to the central plane.

2. The fastener of claim 1, wherein the fastener body further comprises a substantially U-shaped member.

3. The fastener of claim 2, wherein the substantially U-shaped member defines the object aperture.

4. The fastener of claim 1, further comprising an engagement feature created from material displaced from a cavity formed in a material of the elastic abutting flange.

5. The fastener of claim 4, wherein the engagement feature includes a peripheral surface facing toward the panel located in a transition portion of the elastic abutting flange.

* * * * *